March 3, 1936.　　G. G. HARRINGTON　　2,032,575

ROLLER BIT

Filed April 14, 1933

George G. Harrington
INVENTOR.

BY
　　　J. Vincent Martin
　　　　ATTORNEY.

Patented Mar. 3, 1936

2,032,575

UNITED STATES PATENT OFFICE 2,032,575

ROLLER BIT

George G. Harrington, Houston, Tex., assignor to Reed Roller Bit Company, Houston, Tex., a corporation of Texas Application April 14, 1933, Serial No. 666,104

15 Claims. (Cl. 255—71)

This invention relates generally to deep well drills and specifically to roller bits.

It has for its general object the provision of a new and improved roller bit to efficiently drill both hard and semi-hard formations.

One of the specific objects of the invention is to provide a roller bit having cutting teeth constructed and arranged in a new and improved manner to cut the formation in steps.

Other specific objects will hereinafter appear.

Figure 1:
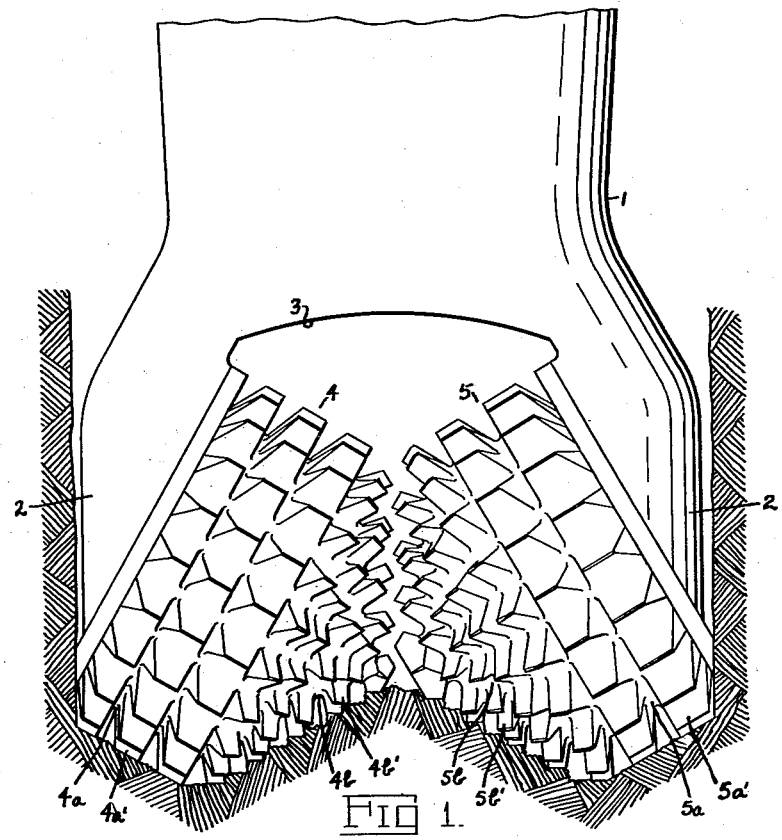
Figure 2:
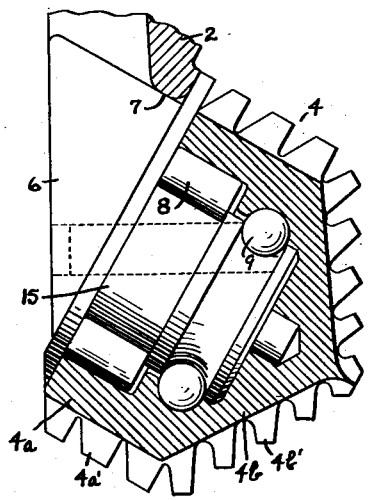

The preferred embodiment of the invention is illustrated by the accompanying drawing, wherein Fig. 1 is a fragmentary sectional elevation of the bit and Fig. 2 a detail view illustrating the cutter and one of the mountings that may be employed.

In the drawing the bit head is indicated at 1. It has oppositely disposed depending bearing projections 2 defining a cutter recess 3. A pair of roller cutters are indicated at 4 and 5.

The cutters 4 and 5 may be mounted to rotate on desired axes by any suitable means such as that illustrated by Fig. 2 wherein the cutter 4 is mounted on a pin 15 having a flat portion 6 slidable into a slot 7 in the bearing projection 2. The portion 6 may be welded in the slot 7 to securely connect the pin 15 to the bearing projection 2. Interposed between the cutter 4 and pin 15 are rollers 8 and balls 9, the latter of which serve to rotatably lock the cutter 4 on the pin 15. It will be understood that any other suitable bearing may be employed.

The cutters 4 and 5 are by the means just described made to rotate on axes inclined downwardly and inwardly substantially toward the longitudinal axis of the head 1. The cutters 4 and 5 may be placed directly opposite each other or slightly offset from the longitudinal axis of the head as desired.

The cutters 4 and 5 have substantially cylindrical base portions 4—a and 5—a and substantially conical point portions 4—b and 5—b. Said portions have annular rows of cutting teeth 4—a', 5—a', 4—b' and 5—b' respectively. The teeth 4—a' and 5—a' on the base portions 4—a and 5—a are so constructed and arranged that the lowermost cutting edge of said base portions extends upwardly and outwardly substantially from the longitudinal axis of the head 1. And the teeth 4—b' and 5—b' on the conical portions 4—b and 5—b are constructed and arranged so that the lowermost cutting edge of said conical sections is defined by upwardly and inwardly stepped cutting teeth, the cutting edges of which extend in planes at substantially right angles to the longitudinal axis of the head 1. In the embodiment shown (Fig. 2) the cutting edges of the teeth 4—a' are substantially parallel with the base portion 4—a; and the cutting teeth 4—b' are at an angle to the conical portion 4—b divergent toward the apex of said portion 4—b. The teeth 5—a' and 5—b' are similarly constructed and disposed.

The rows of teeth 4—a', 4—b', 5—a', and 5—b' are, as shown by Fig. 1, arranged in non-tracking relation.

It will be observed that while the line of contact between the formation and the cutters is relatively long, the area of contact between the cutting teeth and the formation is relatively small.

The various advantages of this new and improved construction and arrangement will be apparent to those skilled in the art. The invention, as defined by the following claims, is not limited to the preferred embodiment therein disclosed.

I claim:

1. A roller bit having a head; and a pair of roller cutters to traverse an area substantially equal to the transverse area of said head; said cutters being rotatable on axes inclined downwardly and inwardly substantially toward the longitudinal axis of said head; said cutters having substantially cylindrical base portions and substantially conical point portions; said portions having thereon annular rows of cutting teeth; said cylindrical portions being outermost; the lowermost parts of said cylindrical portions being defined by the cutting edges of said teeth thereon extending upwardly and outwardly; the lowermost parts of said conical portions being defined by the cutting edges of said teeth thereon as upwardly and inwardly stepped and disposed in planes at substantially right angles to the longitudinal axis of said head; said teeth being arranged in non-tracking relation.

2. A roller bit having a head; and a pair of roller cutters to traverse an area substantially equal to the transverse area of said head; said cutters being rotatable on axes inclined downwardly and inwardly substantially toward the longitudinal axis of said head; said cutters having substantially cylindrical base portions and substantially conical point portions; said portions having thereon annular rows of cutting teeth; said cylindrical portions being outermost; the lowermost parts of said cylindrical portions being defined by the cutting edges of said teeth thereon extending upwardly and outwardly; the lowermost parts of said conical portions being defined by the cutting edges of said teeth thereon as upwardly and inwardly stepped and disposed in planes at substantially right angles to the longitudinal axis of said head.

3. A roller bit having a head; and a pair of roller cutters to traverse an area substantially equal to the transverse area of said head; said cutters being rotatable on axes inclined downwardly and inwardly substantially toward the longitudinal axis of said head; said cutters having substantially cylindrical base portions and substantially conical point portions; said conical portions being innermost and having thereon annular rows of cutting teeth; the lowermost parts of said conical portions being defined by the cutting edges of said teeth upwardly and inwardly stepped and disposed in planes at substantially right angles to the longitudinal axis of said head.

4. A roller bit having a head; and a pair of roller cutters to traverse an area substantially equal to the transverse area of said head; said cutters being rotatable on axes inclined downwardly and inwardly substantially toward the longitudinal axis of said head; said cutters having substantially conical portions the apexes of which are adjacent the longitudinal axis of said head; said portions having thereon annular rows of cutting teeth; the lowermost parts of said portions being defined by the cutting edges of said teeth thereon upwardly and inwardly stepped and disposed in planes at substantially right angles to the longitudinal axis of said head.

5. A roller bit having a head; and a pair of roller cutters having substantially conical portions the apexes of which are adjacent the longitudinal axis of said head and the lowermost parts of which are defined by the cutting edges of upwardly and inwardly stepped cutting teeth, said edges being disposed in planes at substantially right angles to the longitudinal axis of said head.

6. A roller bit having a head; and a pair of roller cutters to traverse an area substantially equal to the transverse area of said head; the outermost portions of said cutters being substantially cylindrical and having cutting teeth thereon; the innermost portions of said cutters having cutting teeth thereon which, when in their cutting positions, are stepped upwardly and inwardly substantially toward the longitudinal axis of said head and have cutting edges in planes at substantially right angles to the longitudinal axis of said head.

7. A roller bit having a head; and a pair of roller cutters; the bottoms of said roller cutters being defined by teeth upwardly and inwardly stepped substantially toward the longitudinal axis of said head and having cutting edges at substantially a right angle to the longitudinal axis of said head.

8. A roller bit having a head; and a pair of roller cutters to traverse an area substantially equal to the transverse area of said head; the lowermost parts of said cutters being defined by cutting teeth with cutting edges lying in different planes and upwardly and inwardly stepped substantially toward the longitudinal axis of said head.

9. A roller bit having a roller cutter the lowermost parts of which are defined by cutting teeth upwardly and inwardly stepped substantially toward the longitudinal axis of said bit and having cutting edges in planes at substantially right angles to the longitudinal axis of said bit.

10. A roller bit having a roller cutter the lowermost edge of which is defined by cutting teeth having cutting edges lying in different planes and upwardly and inwardly stepped substantially toward the longitudinal axis of said bit.

11. A roller cutter having a substantially conical portion and annular rows of cutting teeth on said conical portion, the cutting edges of said teeth being at an angle to said conical portion divergent toward the apex of said conical portion.

12. A roller cutter having a substantially cylindrical base portion and a substantially conical point portion, and annular rows of cutting teeth on said portions, the cutting edges of the teeth on said base portion being substantially parallel with said base portion and the cutting edges of the teeth on said conical portion being at an angle to said conical portion divergent toward the apex of said conical portion.

13. A roller bit having a head in combination with a plurality of roller cutters on said head arranged to rotate on axes extending angularly to the axis of the head, said cutters having substantially cylindrical base and conical point portions, said portions each having a plurality of annularly extending rows of cutting teeth, the cylindrical portions of said cutters being adjacent the peripheral portion of the head and the work engaging teeth thereon extending substantially parallel to the axis of the cutter in an angular direction toward and outwardly of the head, the conical portions of the cutters being adjacent the axis of the head, the work engaging teeth thereon being stepped and extending angularly toward the head and inwardly thereof, and the annular rows of cutting teeth of one of said cutters being arranged to cut in non-tracking relation with respect to the annular rows of cutting teeth on other of said cutters.

14. A roller bit having a head; and a pair of roller cutters to traverse an area substantially equal to the transverse area of said head; said cutters being rotatable on axes inclined downwardly and inwardly substantially toward the longitudinal axis of said head; said cutters having substantially cylindrical base portions and substantially conical point portions; said portions having thereon a plurality of annular rows of cutting teeth; said cylindrical portions being outermost; the lowermost parts of said cylindrical portions being defined by the cutting edges of said teeth thereon extending upwardly and outwardly; the lowermost parts of said conical portions being defined by the cutting edges of said teeth thereon upwardly and inwardly stepped and disposed at substantially a right angle to the longitudinal axis of said head; the annular rows of cutting teeth on one of said cutters being arranged to engage the work in non-tracking relation with respect to the cut on the work by the corresponding rows of teeth on the other cutter.

15. A roller cutter comprising a substantially cylindrical portion and a substantially conical portion, and a plurality of annularly extending rows of cutting teeth having cutting edges on said portions, the cutting edges of the teeth on the cylindrical portion being substantially in a cylindrical surface of revolution of larger diameter and concentric with the axis of the cylindrical portion, and each row of teeth on the conical portion being stepped with respect to each adjacent row thereon and the cutting edges of the teeth on the conical portion being at an angle to the conical portion divergent toward the apex of said portion.

GEORGE G. HARRINGTON.